United States Patent
De Rammelaere et al.

(10) Patent No.: US 9,156,543 B2
(45) Date of Patent: Oct. 13, 2015

(54) CONTROL SYSTEM FOR AN AIRCRAFT

(71) Applicants: Airbus Operations (SAS), Toulouse (FR); Airbus Operations GmbH, Hamburg (DE); Airbus SAS, Blagnac Cedex (FR)

(72) Inventors: Werner De Rammelaere, Tournefeuille (FR); Jean-Claude Laperche, Colomiers (FR); Mathieu Rebut, Toulouse (FR); Benoit Berthe, Toulouse (FR); Hartmut Hintze, Schwarzenbek (FR); Sebastian Krittian, Hamburg (DE)

(73) Assignees: Airbus Operations SAS, Toulouse (FR); Airbus SAS, Blagnac (FR); Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/475,779

(22) Filed: Sep. 3, 2014

(65) Prior Publication Data

US 2015/0088341 A1    Mar. 26, 2015

(30) Foreign Application Priority Data

Sep. 23, 2013   (EP) ..................................... 13185480

(51) Int. Cl.
*B64C 19/00* (2006.01)
*G05D 1/00* (2006.01)

(52) U.S. Cl.
CPC .............. *B64C 19/00* (2013.01); *G05D 1/0077* (2013.01)

(58) Field of Classification Search
CPC ............................... B64C 19/00; G05D 1/0077
USPC .............. 701/3, 29.1, 34.3, 36; 714/E11.054, 714/E11.059
See application file for complete search history.

(56) References Cited

U.S. PATENT DOCUMENTS

| 4,115,847 A | * | 9/1978 | Osder et al. ....................... 700/4 |
| 4,422,180 A | | 12/1983 | Wendt |
| 5,493,497 A | * | 2/1996 | Buus ................................. 701/4 |

(Continued)

FOREIGN PATENT DOCUMENTS

| EP | 2595023 | 5/2013 |
| WO | 9529434 | 11/1995 |

OTHER PUBLICATIONS

European Search Report, Apr. 30, 2014.

*Primary Examiner* — Russell Frejd
(74) *Attorney, Agent, or Firm* — Greer, Burns & Crain Ltd.

(57) ABSTRACT

The control system of an aircraft including at least two communication networks and a controlled device control unit connected to one of them. The system determines control commands for the device with a DAL-A quality assurance level requirement and includes a set of at least three physical units each including at least two computers, an electrical power supply and a network interface device. The electrical power supplies, and the network interface devices, are of at least three different types, the computers are of at least two different types and include operating systems of at least two different types; the computers each have a DAL-C, DAL-D or DAL-E hardware and/or software quality assurance level and at least six of the computers are configured to independently determine control commands for the device. A DAL-A hardware and software quality assurance level selection logic unit is configured to select valid control commands used by the control unit to control the device.

14 Claims, 5 Drawing Sheets

(56) References Cited

U.S. PATENT DOCUMENTS

| | | |
|---|---|---|
| 5,515,282 A | 5/1996 | Jackson |
| 5,550,731 A | 8/1996 | Jackson |
| 5,550,736 A * | 8/1996 | Hay et al. .................... 701/3 |
| 6,862,696 B1 * | 3/2005 | Voas et al. ................ 714/38.11 |
| 7,913,232 B2 * | 3/2011 | Erkkinen ..................... 717/126 |
| 8,266,066 B1 * | 9/2012 | Wezter et al. ................. 705/78 |
| 2004/0098140 A1 | 5/2004 | Hess |
| 2006/0100750 A1 | 5/2006 | Platzer et al. |
| 2009/0031198 A1 * | 1/2009 | Johansson ..................... 714/799 |
| 2010/0292870 A1 * | 11/2010 | Saint Marc et al. ............... 701/3 |
| 2013/0124019 A1 | 5/2013 | Fukui et al. |

* cited by examiner

CONTROL SYSTEM FOR AN AIRCRAFT

CROSS-REFERENCES TO RELATED APPLICATIONS

This application claims the benefit of the European patent application No. 13185480.14 filed on Sep. 23, 2013, the entire disclosures of which are incorporated herein by way of reference.

BACKGROUND OF THE INVENTION

The present invention relates to an aircraft control system. Modern aircraft, in particular transport airplanes, comprise a control system making it possible to drive the various functions of the said aircraft: flight controls, flight management of FMS ("Flight Management System") type, FWS ("Flight Warning System") alerts management, downloading of data, etc. This control system generally comprises a set of computers which may equally well be computers dedicated to the various functions, and then named LRU ("Line Replaceable Unit"), or generic computers into which the various functions are programmed. These generic computers constitute an integrated modular avionics architecture termed IMA ("Integrated Modular Avionics"). For airworthiness reasons, certifying authorities require that the various functions implemented in aircraft have a quality assurance level sufficient to guarantee the safety of the aircraft. This quality assurance level is generally called DAL ("Design Assurance Level"). The regulatory requirements relating to the DAL level of the various functions of an aircraft are expressed in the document Eurocae ED-79A/SAE ARP 4754A. This document defines five levels of quality assurance for the functions of an aircraft, respectively named DAL-A, DAL-B, DAL-C, DAL-D and DAL-E in descending order of requirements. The DAL-A level corresponds to functions whose failure would have a catastrophic impact for the aircraft; the DAL-B level corresponds to functions whose failure would have a dangerous impact for the aircraft; the DAL-C level corresponds to functions whose failure would have a major impact for the aircraft; the DAL-D level corresponds to functions whose failure would have a minor impact for the aircraft; the DAL-E level corresponds to functions whose failure would not have any consequence for the safety of the aircraft. Thus, for example, the aircraft's flight controls correspond to a DAL-A level function; by contrast, the functions relating to the entertainment of the passengers are of DAL-E level.

The quality assurance level necessary for a function of the aircraft involves requirements relating to the quality assurance level of the various systems (computers, electrical power supplies, communication networks, etc.) used to implement this function. These quality assurance level requirements of the said systems are defined, as a function of the quality assurance level necessary for the said function, in the document Eurocae ED-79A/SAE ARP 4754A, both as regards the hardware aspect and as regards the software aspect of the said systems. Accordingly, this document defines several levels of quality assurance for the systems, these levels being likewise named DAL-A, DAL-B, DAL-C, DAL-D and DAL-E in descending order of requirements. The standards DO-254 on the one hand and DO-178B (or DO-178C) on the other hand, specify development constraints to be complied with as a function of the quality assurance level necessary for a system, respectively for the hardware aspect and for the software aspect of the said system.

The critical functions for the flight of the aircraft (DAL-A functions) must thus be implemented by DAL-A certified systems. Moreover, certain functions, such as the flight controls, are generally implemented in a dissimilar manner on various DAL-A systems so as to avoid common breakdown modes. By contrast, the functions not exhibiting any criticality for the flight of the aircraft (DAL-E functions) can be implemented by DAL-E systems. The DAL-E level generally corresponds to systems available off the shelf commercially, sometimes called COTS ("Components Off The Shelf").

DAL-A certified systems must form the subject of a lengthy and expensive development process so as to comply with the necessary level of requirements. As a result of this, for example, the electronic components used must be tested for several years before they can be implemented in a DAL-A system. Moreover, these components are chosen from ranges of components able to withstand severe environmental conditions, both in regard to operating temperature and to vibrations. Moreover, the lifetime of an aircraft is generally several tens of years. Moreover, one and the same type of aircraft is also manufactured, in general, for several tens of years. Consequently, more than 50 or 60 years may elapse between the design of a type of aircraft and the cessation of operational use of the last aircraft of this type. Such a duration is incompatible with the duration of commercialization of the electronic components used, which is generally less than about ten years in the best cases. This compels the manufacturers of the said systems to stock the necessary components in sufficient number to ensure both the maintenance and the manufacture of the systems for new aircraft over a period of several tens of years.

SUMMARY OF THE INVENTION

An object of the present invention is to remedy the aforementioned drawbacks. It relates to a control system for at least one controlled device of an aircraft, this control system being embedded onboard the aircraft and comprising:
  at least two distinct communication networks; and
  at least one control unit associated with this at least one controlled device, this control unit being connected to at least one of the said communication networks,
  the said control system being configured to determine and provide control commands to this controlled device, the determination of the said control commands corresponding to a first function of the aircraft having a DAL-A quality assurance level requirement.

This control system is noteworthy in that it furthermore comprises:
  a set of at least three physical units each comprising an electrical power supply and a network interface device connected to at least one of the said communication networks of the aircraft, in which:
    the electrical power supplies of the various physical units are of at least three different types;
    the network interface devices of the various physical units are of at least three different types;
    each of the physical units comprises at least two computers each comprising an operating system;
    the various computers of the various units are of at least two different types;
    the operating systems of the various computers are of at least two different types;
    at least six of the said computers are configured to independently determine control commands for the said controlled device, these control commands corresponding to the said first function;
    the various computers each have a DAL-C, DAL-D or DAL-E hardware and/or software quality assurance level; and a selection logic unit whose hardware and software quality assurance level is DAL-A, this selection logic unit being connected to these at least two communication networks and being configured to select valid control commands from among the control commands determined by the computers, the control unit associated with the said controlled device being configured to control the controlled device as a function of the valid control commands selected by the selection logic unit.

This system therefore allows the use of computers having a DAL-C, DAL-D or DAL-E hardware and/or software quality assurance level to implement a function having a DAL-A quality assurance level requirement, instead of needing computers having a DAL-A level like the prior art systems. This results in much less significant costs and development times than for the prior art systems. Consequently, the hardware used for these computers can be renewed regularly as technology evolves, without this representing a prohibitive cost. The use of computers having a lesser quality assurance level than those of the prior art is rendered possible by virtue of the devising of the control system according to the invention: the clever combining of equipment (physical units, computers, power supplies, network interface devices, etc.) of different types makes it possible to guarantee correct operation of at least one computer with a probability of breakdown that is compatible with the DAL-A quality assurance level requirement necessary for the said function. Moreover, by grouping several computers together in physical units, it is made possible to share their electrical power supplies and their network interface devices, therefore to decrease the mass, the bulkiness and the cost of the control system.

In an advantageous manner, the said at least six computers are configured to determine the control commands for the controlled device, corresponding to the first function, according to a mode of formulation of the said control commands that is common to these at least six computers. This avoids a dissimilar implementation of the first function on different computers, thus making it possible to further reduce development times and costs.

Preferably, the various electrical power supplies and the various network interface devices each have a DAL-E hardware and/or software quality assurance level. This makes it possible to choose such hardware from among the hardware available commercially, without necessitating specific development costs.

In a particular embodiment, the set of physical units comprises three physical units each comprising three computers of three different types, the various computers each having a DAL-C hardware and/or software quality assurance level.

In another embodiment, the set of physical units comprises four physical units each comprising at least three computers each having a DAL-E hardware and/or software quality assurance level, in which:
- the various computers are of four different types;
- each physical unit comprises computers of at least two different types;
- the electrical power supplies of the four physical units are all of different types;
- the network interface devices of the four physical units are all of different types;
- the operating systems of the at least three computers of each physical unit are of at least three different types.

According to a first variant, each of the four physical units comprises three computers of two different types, each computer being configured to determine control commands for the controlled device, these control commands corresponding to the said first function.

According to a second variant, each of the four physical units comprises six computers each having a DAL-E hardware and/or software quality assurance level.

Advantageously, a part of the computers is not configured to implement a function having a DAL-A or DAL-B quality assurance level requirement, these computers being configured to implement at least one second function having a DAL-C, DAL-D or DAL-E quality assurance level requirement.

In an advantageous manner, at least part of the computers configured to determine the control commands corresponding to the said first function are also configured to implement at least one third function having a DAL-A or DAL-B quality assurance level requirement.

According to a first alternative, the selection logic unit is integrated into a computer distinct from the control unit associated with the controlled device. According to another alternative, the selection logic unit is integrated into the control unit associated with the controlled device.

In a particular embodiment, the first function relates to flight controls of the aircraft and the controlled device comprises an actuator of a movable flight surface of the aircraft.

In a preferred manner, the various physical units are protected by at least one environmental protection device.

The invention also relates to an aircraft comprising a control system such as aforementioned.

BRIEF DESCRIPTION OF THE DRAWINGS

The invention will be better understood on reading the description which follows and on examining the appended figures.

DETAILED DESCRIPTION OF THE PREFERRED EMBODIMENTS

Figure 1:
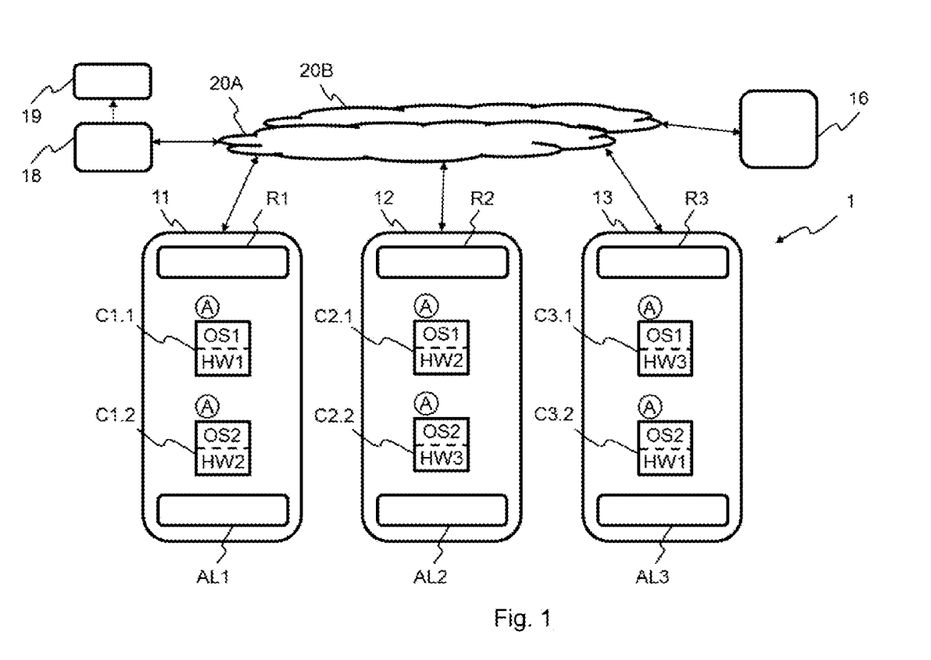
FIG. 1 represents a control system in accordance with an embodiment of the invention.
Figure 2:
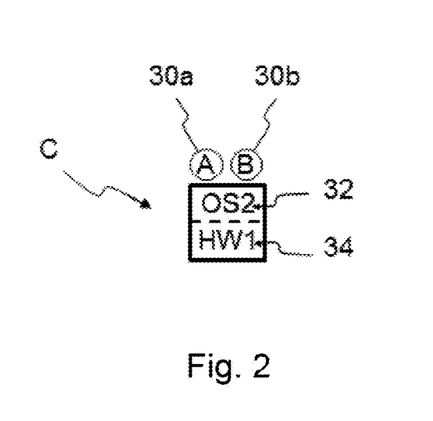
FIG. 2 illustrates the representation used for a computer of the control system.

The control system 1 of an aircraft, such as represented in FIG. 1, comprises a set of three physical units 11, 12, 13, which each comprise an electrical power supply, respectively AL1, AL2, AL3, and a network interface device, respectively R1, R2, R3. These three power supplies are all of different types. Likewise, the three network interface devices are all of different types. Each of the three physical units is linked, by way of its network interface device, to two communication networks 20A, 20B of the aircraft. Preferably, these communication networks are of deterministic switched Ethernet type, for example in accordance with ARINC standard 664 part 7 also known under the Airbus trademark, AFDX. Each physical unit comprises two computers: C1.1 and C1.2 for the physical unit 11, C2.1 and C2.2 for the physical unit 12, C3.1 and C3.2 for the physical unit 13. FIG. 2 illustrates the representation used for these computers. Thus, the illustration of a computer C represents the operating system 32 used on this computer, as well as the hardware type 34 of the said computer. The computer represented in FIG. 2 is of the hardware type HW1 and comprises an operating system OS2. The term operating system is used in its broadest sense, that is to say including the intermediate software layers ("middleware"). At least one circle 30a, 30b is represented in the top part of the figure. Each circle contains a letter A, B, C, D or E corresponding to the quality assurance level requirement of at least one function implemented by this computer C. The letter A corresponds to the DAL-A level, the letter B corresponds to the DAL-B level, the letter C corresponds to the DAL-C level, the letter D corresponds to the DAL-D level and the letter E corresponds to the DAL-E level. Two circles 30a and 30b are associated with the computer C represented in FIG. 2. These two circles respectively contain the letters A and B. This signifies that the computer C implements at least one function having a DAL-A quality assurance level requirement and at least one function having a DAL-B quality assurance level requirement. The term "function implemented by a computer" signifies that this computer determines control commands for a controlled device, in accordance with the said function.

The six computers represented in FIG. 1 each implement at least one function having a DAL-A quality assurance level requirement. The two computers of each physical unit are of two different hardware types: HW1 and HW2 for the computers C1.1 and C1.2 of the physical unit 11, HW2 and HW3 for the computers C2.1 and C2.2 of the physical unit 12, HW3 and HW1 for the computers C3.1 and C3.2 of the physical unit 13. The operating systems of the two computers of each physical unit are of two different types OS1 and OS2. These six computers each have a DAL-C, DAL-D or DAL-E hardware and/or software quality assurance level. This software quality assurance level corresponds to the quality assurance level of the operating system, including the intermediate software layers as indicated previously. Each of the six computers is linked to the network interface device R1, R2, R3 of the physical unit of which it forms part.

The control system 1 furthermore comprises a control unit 18 for a controlled device 19 of the aircraft. The control unit 18 is linked to the two communication networks 20A and 20B. The control system 1 is configured to determine and provide control commands to the controlled device 19, the determination of the said control commands corresponding to a first function of the aircraft having a DAL-A quality assurance level requirement. Accordingly, the six computers C1.1, C1.2, C2.1, C2.2, C3.1 and C3.2 are configured to implement this first function. These six computers are thus configured to independently determine the control commands for the controlled device 19 and to each transmit these control commands over the communication networks 20A and 20B by way of the network interface device R1, R2 or R3 to which it is linked. Accordingly, a software application corresponding to the first function is loaded into each of the six computers. This software application complies with the quality assurance level requirements of the first function to which it corresponds, namely DAL-A.

The control system 1 also comprises a selection logic unit 16 having a DAL-A hardware and software quality assurance level. This selection logic unit is connected to the two communication networks 20A and 20B. It is configured to receive the control commands determined by the computers and to select valid control commands from among these control commands determined by the computers. The selection of the valid control commands may for example be carried out by using the known voter principle. The control unit 18 associated with the controlled device 19 is configured to control the controlled device 19 as a function of the valid control commands selected by the selection logic unit 16.

Preferably, the various electrical power supplies AL1, AL2, AL3 and the various network interface devices R1, R2, R3 each have a DAL-E hardware and/or software quality assurance level. This makes it possible to choose such hardware from among the hardware available commercially, without necessitating specific development costs.

Figure 3:
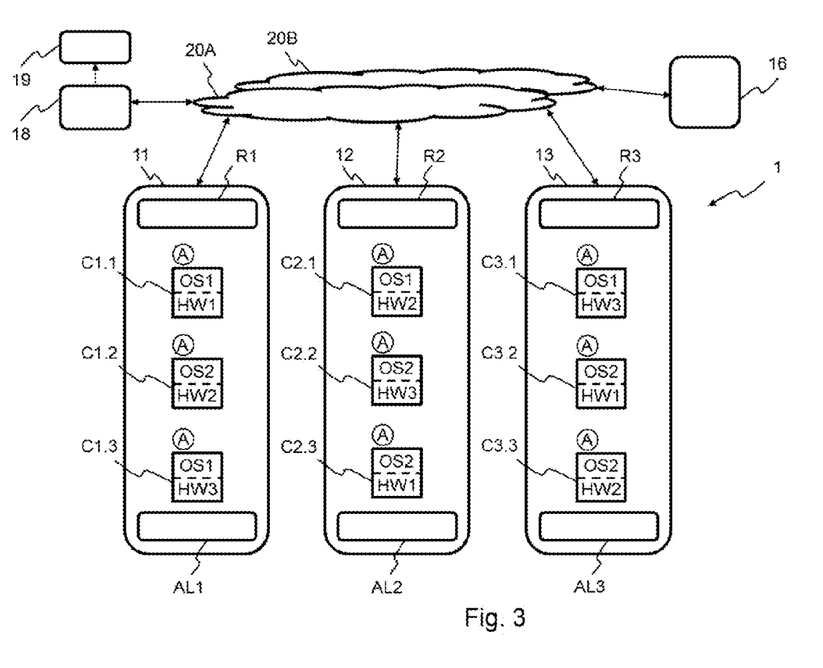
FIGS. 3 to 5 represent various embodiments of a control system in accordance with the invention.

The control system 1 represented in FIG. 3 is similar to that described previously with reference to FIG. 1. However, each of the three physical units 11, 12, 13 furthermore comprises a third computer, respectively C1.3, C2.3, C3.3. These computers are chosen in such a way that the three computers of each physical unit are of three different hardware types: HW1, HW2 and HW3. The three computers C1.3, C2.3, C3.3 are likewise configured to implement the first function. Consequently, the control system 1 comprises nine computers which are all configured to independently determine the control commands for the controlled device 19 and to each transmit these control commands over the communication networks 20A and 20B by way of the network interface device R1, R2 or R3 to which it is linked. Preferably, these nine computers each have a DAL-C hardware and/or software quality assurance level. On account of the use of nine computers of at least three different types, these computers corresponding to a DAL-C quality assurance level, the probability of a total breakdown of the control system 1 is low enough to be compatible with the DAL-A quality assurance level requirement of the first function. The term total breakdown of the control system 1 is used to designate a breakdown of the said control system which would render it impossible to determine the control commands for the controlled device 19 in accordance with the first function or to transmit them to the selection logic unit 16. A total breakdown such as this could only occur if none of the computers were able to determine the control commands for the controlled device 19 and to transmit these commands to the selection logic unit 16. The use of computers corresponding to a DAL-C quality assurance level allows a significant reduction in the development times and the costs of the said computers with respect to the computers, corresponding to a DAL-A quality assurance level, conventionally used to implement this first function.

Figure 4:
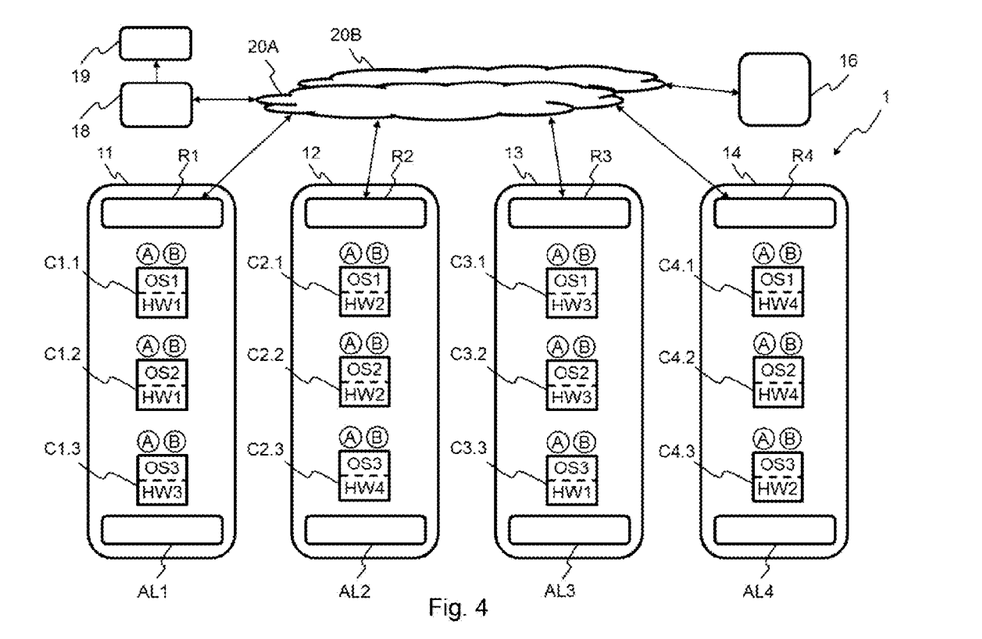

The control system 1 represented in FIG. 4 is similar to that described previously with reference to FIG. 3. However, it furthermore comprises a fourth physical unit 14, which likewise comprises three computers C4.1, C4.2 and C4.3 of two different types. These three computers are likewise configured to implement the first function. The twelve computers of the four physical units are of four different hardware types HW1, HW2, HW3 and HW4. The fourth physical unit 14 comprises an electrical power supply AL4 of a different type from the electrical power supplies of the other three physical units, in such a way that the electrical power supplies AL1, AL2, AL3 and AL4 of the four physical units are of four different types. This fourth physical unit 14 also comprises a network interface device R4 of a different type from the network interface devices of the other three physical units, in such a way that the network interface devices R1, R2, R3 and R4 of the four physical units are of four different types. Preferably, the various electrical power supplies AL1, AL2, AL3, AL4 and the various network interface devices R1, R2, R3, R4 each have a DAL-E hardware and/or software quality assurance level. The operating systems of the three computers of each of the four physical units are of three different types OS1, OS2, OS3. Preferably, the twelve computers each have a DAL-E hardware and/or software quality assurance level, thereby allowing a significant reduction in their cost with respect to the computers, corresponding to a DAL-A quality assurance level, conventionally used to implement the first function. Moreover, this makes it possible to use commercially available computers, without necessitating specific development: this results in a significant reduction in the development time of the control system 1, especially as regards its hardware aspect. This moreover makes it possible to use computers available commercially at the time of their integration into the control system 1, without needing to stock computers corresponding to several years of production of such control systems.

The control system 1 therefore uses very dissimilar components: four types of electrical power supplies, four types of network interface devices, four hardware types of computers, three types of operating systems of the computers. Moreover, it uses a significant number of computers, allowing a high level of redundancy, since the twelve aforementioned computers are all configured to implement the first function by independently formulating the control commands for the controlled device 19. This set of characteristics makes it possible, although these components are commercially available components, corresponding therefore to a DAL-E quality assurance level, to obtain a probability of total breakdown of the control system 1 low enough to be compatible with the DAL-A quality assurance level requirement of the first function.

In an advantageous embodiment, the twelve computers of the four physical units are furthermore configured to implement at least one other function having a DAL-A quality assurance level requirement. This makes it possible to implement a plurality of functions having a DAL-A quality assurance level requirement by means of the same computers.

In a particular embodiment, the twelve computers of the four physical units, or at least a subset of the said twelve computers, are furthermore configured to implement at least one function having a DAL-B quality assurance level requirement. This therefore makes it possible to use the same computers to implement at one and the same time functions having a DAL-A quality assurance level requirement and functions having a DAL-B quality assurance level requirement, so as to limit the number of computers used.

Figure 5:
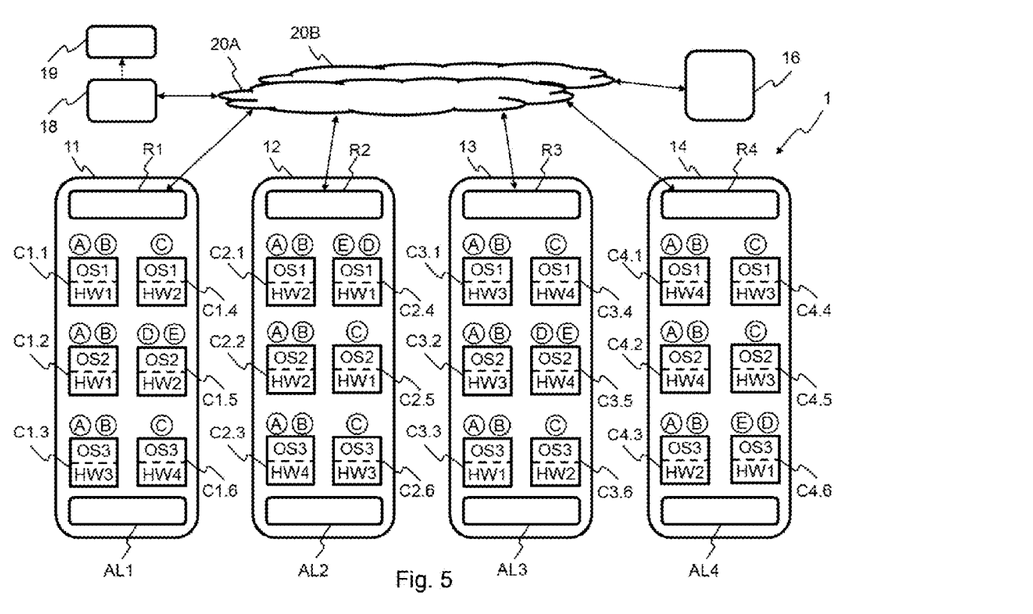

In an advantageous embodiment represented in FIG. 5, the four physical units 11, 12, 13, 14 furthermore each comprise three additional computers. Thus, the physical unit 11 furthermore comprises the computers C1.4, C1.5 and C1.6; the physical unit 12 furthermore comprises the computers C2.4, C2.5 and C2.6; the physical unit 13 furthermore comprises the computers C3.4, C3.5 and C3.6; the physical unit 14 furthermore comprises the computers C4.4, C4.5 and C4.6. These additional computers each have a DAL-E hardware and/or software quality assurance level. They are configured to implement at least one function having a DAL-C, DAL-D or DAL-E quality assurance level requirement, by formulating control commands corresponding to this function. Accordingly, a software application corresponding to this function is loaded into each of the said computers. This software application complies with the DAL-C, DAL-D or DAL-E quality assurance level requirements of the said function to which it corresponds. These additional computers are not configured to implement a function having a DAL-A or DAL-B quality assurance level requirement. This embodiment makes it possible to be able to also implement, in the same control device 1, at least one function having a DAL-C, DAL-D or DAL-E quality assurance level requirement, while guaranteeing segregation between on the one hand the functions having a DAL-A or DAL-B quality assurance level requirement and on the other hand the functions having a DAL-C, DAL-D or DAL-E quality assurance level requirement. Thus, the implementation of the functions having a DAL-C, DAL-D or DAL-E quality assurance level requirement does not risk interfering with the implementation of the functions having a DAL-A or DAL-B quality assurance level requirement and for which a failure could have a catastrophic or dangerous impact for the aircraft. To implement this at least one function having a DAL-C, DAL-D or DAL-E quality assurance level requirement, the control device 1 furthermore comprises at least one other selection logic unit (not represented), which is configured to select valid control commands from among the control commands determined by the additional computers. Advantageously, the hardware and software quality assurance level of this other selection logic unit corresponds to the quality assurance level of the said function.

In a particular exemplary embodiment of the invention, illustrated by FIG. 5, from among these additional computers, two computers of each physical unit are configured to implement at least one function having a DAL-C quality assurance level requirement, namely the computers C1.4, C1.6, C2.5, C2.6, C3.4, C3.6, C4.4 and C4.5. These computers are not configured to implement a function having a DAL-D or DAL-E quality assurance level requirement. The other additional computer of each physical unit is configured to implement at least one function having a DAL-D or DAL-E quality assurance level requirement. Four computers are thus reserved for the functions having a DAL-D or DAL-E quality assurance level requirement, namely the computers C1.5, C2.4, C3.5 and C4.6. This makes it possible to guarantee segregation between on the one hand functions having a DAL-C quality assurance level requirement and on the other hand functions having a DAL-D or DAL-E quality assurance level requirement. Thus, the implementation of the functions having a DAL-D or DAL-E quality assurance level requirement does not risk interfering with the implementation of the functions having a DAL-C quality assurance level requirement.

In the various aforementioned embodiments, the computers having a DAL-E hardware and/or software quality assurance level advantageously correspond to computers available commercially each in the form of a printed circuit board grouping together the set of constituent components of this computer. Generally the area of such a printed circuit board is only a few square centimeters. Such a computer can also take the form of a miniature housing of size substantially similar to the size of a USB Key®. Each physical unit then takes the form of a housing grouping together an electrical power supply, a network interface device corresponding for example to a switch or to a commercially available Ethernet router, as well as the various computers of the said physical unit. Given the miniature size of the various computers, each physical unit exhibits a very restricted size and mass. It follows from this that the bulkiness and the mass of the control device 1 are greatly reduced with respect to the bulkiness and to the mass of a conventional control device. This makes it possible to reduce the fuel consumption of the aircraft or to transport more passengers. This also makes it possible to facilitate the integration of the physical units into the aircraft. Thus, these physical units are not necessarily integrated into an avionics rack of the aircraft like the computers of the prior art.

Commercially available computers generally require less severe environmental conditions than the environmental conditions to which the computers customarily used aboard aircraft are liable to be exposed. These environmental conditions relate especially to temperature and to vibrations. They may also include protection against lightning or against electromagnetic disturbances, etc. However, the environmental conditions inside the cabin of the aircraft are generally compatible with the operation of the said commercially available computers. Consequently, according to an embodiment, the various physical units 11, 12, 13, 14 are installed inside the cabin of the aircraft.

However, in certain cases, installation constraints may make it necessary to install the physical units outside of the cabin of the aircraft, for example in a non-air-conditioned and/or non-pressurized bay of the aircraft. In order to address such a need, according to a preferred embodiment, the various physical units are protected by at least one environmental protection device corresponding to at least one of the following devices:
- an air-conditioning device;
- a device for damping vibrations;
- a device for protecting against electromagnetic disturbances.

According to a first alternative, this at least one device is specific to each physical unit. For example, each physical unit has its own air-conditioning or vibration damping device. According to another alternative, this at least one device is common to a plurality of the said physical units. For example, several physical units are grouped together during their installation and use one and the same air-conditioning or vibration damping device.

According to a first variant, the selection logic unit 16 is integrated into a computer distinct from the control unit 18 associated with the controlled device 19. This computer can thus also host one or more other selection logic units corresponding to one or more other controlled devices.

According to another variant, the selection logic unit 16 is integrated into the control unit 18 associated with the controlled device 19.

Figure 6:
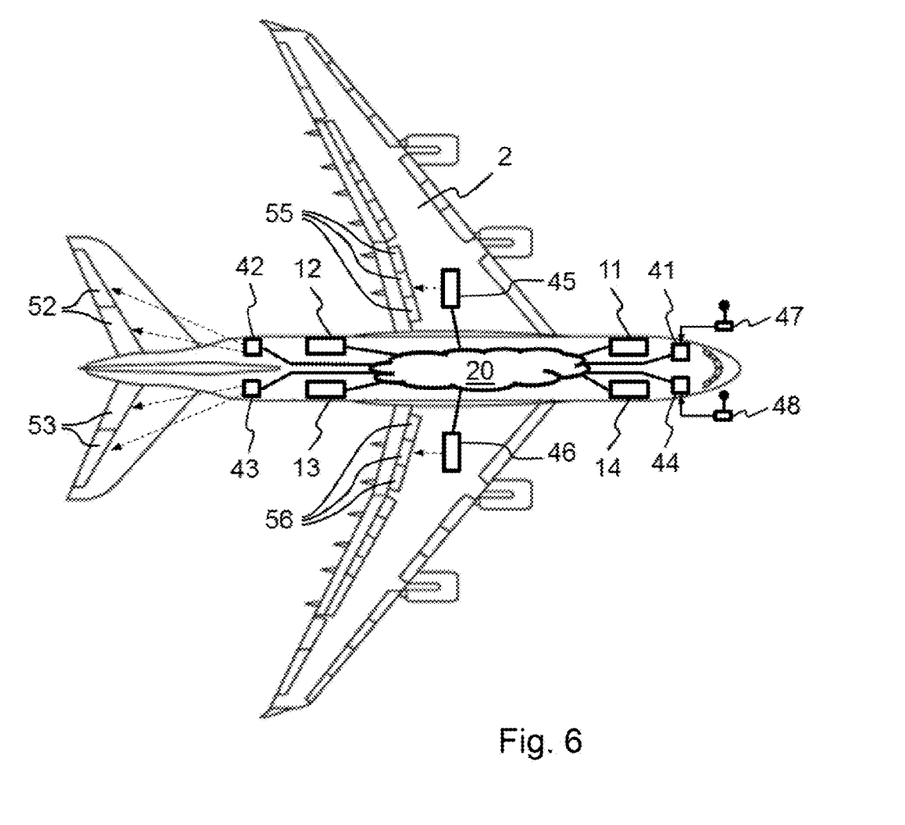
FIG. 6 represents a flight control system according to an embodiment in accordance with the invention.

In a particular exemplary embodiment in accordance with the invention, illustrated by FIG. 6, the first function corresponds to flight controls of the aircraft. The controlled device 19 comprises an actuator of a movable flight surface of the aircraft. This movable flight surface corresponds for example to a flap or to an aileron 55, 56 or to an elevator 52, 53. Other movable flight surfaces of the aircraft can be considered without departing from the scope of the invention. Control units 42, 43, 45, 46 are respectively associated with the elevators 52, 53 and with the flaps and/or ailerons 55, 56. These control units are linked to a set 20 of at least two communication networks such as aforementioned. In the example represented in FIG. 6, a selection logic unit, not represented, is integrated into each of the control units 42, 43, 45, 46. However, without departing from the scope of the invention, provision could be made for another computer connected to the set 20 of communication networks and hosting several selection logic units associated respectively with each of the control units 42, 43, 45, 46 and therefore with each of the respective movable flight surfaces 52, 53, 55, 56. Four physical units 11, 12, 13, 14 in accordance with one of the aforementioned embodiments are also linked to the set 20 of communication networks. For segregation reasons, the physical units 11 and 14 are situated in a front part of the fuselage of the aircraft, the physical units 12 and 13 being for their part situated in a rear part of the fuselage. Moreover, the physical units 11 and 12 are situated on the left side of the fuselage and the physical units 13 and 14 are situated on the right side of the fuselage. Two interface units 41 and 44 are also linked to this set 20 of communication networks. These interface units are also linked respectively to control means 47 and 48 situated in the cockpit, for example yokes or mini-yokes.

During operation, the pilots of the aircraft act on the yokes 47, 48 which produce electrical signals depending on their positions and representing commands given by the pilots. These signals are received by the respective interface units 41 and 44 which consequently dispatch information representative of the commands given by the pilots, to the set 20 of communication networks, destined for the four physical units 11, 12, 13, 14. This information is received by the computers of the said physical units configured to determine control commands corresponding to the said first function, that is to say control commands for the movable flight surfaces 52, 53, 55, 56. These computers determine these control commands independently of one another, according to flight control laws for the aircraft, as a function of the said information representative of the commands given by the pilots. Each computer computes control commands for the various movable flight surfaces 52, 53, 55, 56 and dispatches these commands to the set 20 of communication networks, destined for the selection logic units respectively associated with each of the said movable flight surfaces. Thus, each selection logic unit associated with one of the movable flight surfaces 52, 53, 55, 56 receives the control commands determined by the various computers for this movable flight surface. This selection logic unit selects valid control commands from among the control commands received from the various computers. To select these valid control commands, the selection logic unit may for example use a voter. It transmits the commands thus selected to the control unit associated with the movable flight surface considered and this control unit controls the said flight surface accordingly.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A control system for at least one controlled device of an aircraft, the control system being embedded onboard the aircraft and comprising:
   at least two distinct communication networks; and
   at least one control unit associated with this at least one controlled device, this control unit being connected to at least one of the said communication networks,
   the control system being configured to determine and provide control commands to the controlled device, the determination of the control commands corresponding to a first function of the aircraft having a DAL-A quality assurance level requirement,
   the control system further comprising:
   a set of at least three physical units each comprising an electrical power supply and a network interface device connected to at least one of the communication networks of the aircraft, in which:
   the electrical power supplies of the various physical units being of at least three different types;
   the network interface devices of the various physical units being of at least three different types;
   each of the physical units comprising at least two computers each comprising an operating system;
   the various computers of the various units being of at least two different types;
   the operating systems of the various computers being of at least two different types;
   at least six of the computers being configured to independently determine control commands for the said controlled device, these control commands corresponding to the said first function;

the various computers each having at least one of a DAL-C, DAL-D or DAL-E hardware and software quality assurance level; and a selection logic unit whose hardware and software quality assurance level is DAL-A, the selection logic unit being connected to the at least two communication networks and being configured to select valid control commands from among the control commands determined by the computers, the control unit associated with the said controlled device being configured to control the controlled device as a function of the valid control commands selected by the selection logic unit.

2. The control system according to claim 1, wherein the at least six computers are configured to determine the control commands for the controlled device, corresponding to the first function, according to a mode of formulation of the said control commands that is common to the at least six computers.

3. The control system according to claim 1, in which the various electrical power supplies and the various network interface devices each have at least one of a DAL-E hardware and software quality assurance level.

4. The control system according to claim 1, wherein the set of physical units comprises three physical units, each comprising three computers of three different types, the various computers each having at least one of a DAL-C hardware and software quality assurance level.

5. The control system according to claim 1, in which the set of physical units comprises four physical units, each comprising at least three computers each having at least one of a DAL-E hardware and software quality assurance level, in which:
the various computers are of four different types;
each physical unit comprises computers of at least two different types;
the electrical power supplies of the four physical units are all of different types;
the network interface devices of the four physical units are all of different types; and
the operating systems of the at least three computers of each physical unit are of at least three different types.

6. The control system according to claim 5, wherein each of the four physical units comprises three computers of two different types, each computer being configured to determine control commands for the controlled device, these control commands corresponding to the said first function.

7. The control system according to claim 5, wherein each of the four physical units comprises six computers each have at least one of a DAL-E hardware and software quality assurance level.

8. The control system according to claim 7, wherein some of the computers are not configured to implement a function having a DAL-A or DAL-B quality assurance level requirement, these computers being configured to implement at least one second function having a DAL-C, DAL-D or DAL-E quality assurance level requirement.

9. The control system according to claim 4, wherein at least some of the computers configured to determine the control commands corresponding to the first function are also configured to implement at least one third function having a DAL-A or DAL-B quality assurance level requirement.

10. The control system according to claim 1, wherein the selection logic unit is integrated into a computer distinct from the control unit associated with the controlled device.

11. The control system according to claim 1, wherein the selection logic unit is integrated into the control unit associated with the controlled device.

12. The control system according to claim 1, wherein the first function relates to flight controls of the aircraft and the controlled device comprises an actuator of a movable flight surface of the aircraft.

13. The control system according to claim 1, wherein the various physical units are protected by at least one environmental protection device.

14. An aircraft comprising a control system for at least one controlled device of the aircraft, the control system being embedded onboard the aircraft and comprising:
at least two distinct communication networks; and
at least one control unit associated with this at least one controlled device, this control unit being connected to at least one of the said communication networks,
the control system being configured to determine and provide control commands to the controlled device, the determination of the control commands corresponding to a first function of the aircraft having a DAL-A quality assurance level requirement,
the control system further comprising:
a set of at least three physical units each comprising an electrical power supply and a network interface device connected to at least one of the communication networks of the aircraft, in which:
the electrical power supplies of the various physical units being of at least three different types;
the network interface devices of the various physical units being of at least three different types;
each of the physical units comprising at least two computers each comprising an operating system;
the various computers of the various units being of at least two different types;
the operating systems of the various computers being of at least two different types;
at least six of the computers being configured to independently determine control commands for the said controlled device, these control commands corresponding to the said first function;
the various computers each having at least one of a DAL-C, DAL-D or DAL-E hardware and software quality assurance level; and
a selection logic unit whose hardware and software quality assurance level is DAL-A, the selection logic unit being connected to the at least two communication networks and being configured to select valid control commands from among the control commands determined by the computers,
the control unit associated with the said controlled device being configured to control the controlled device as a function of the valid control commands selected by the selection logic unit.

\* \* \* \* \*